United States Patent [19]

Paul et al.

[11] Patent Number: 4,809,646
[45] Date of Patent: Mar. 7, 1989

[54] HIGH PRESSURE RECIPROCATOR COMPONENTS

[76] Inventors: Marius A. Paul; Ana Paul, both of 969 La Paz Rd., Placentia, Calif. 92690

[21] Appl. No.: 27,400

[22] Filed: Mar. 18, 1987

[51] Int. Cl.⁴ ............................................. F02B 25/08
[52] U.S. Cl. ........................... 123/51 B; 123/197 AC; 123/52 A; 277/148
[58] Field of Search ............. 123/51 R, 51 B, 51 BA, 123/52 B, 197 R, 197 AB, 197 AC; 60/605.1; 277/220, 138, 148, 193

[56] References Cited

U.S. PATENT DOCUMENTS

| 2,525,460 | 10/1950 | Roesch | 123/51 BA |
| 3,917,290 | 11/1975 | Geffroy | 277/193 |
| 4,633,671 | 1/1987 | Schatz | 60/605 |

FOREIGN PATENT DOCUMENTS

| 83634 | 5/1982 | Japan | 123/197 AC |

Primary Examiner—David A. Okonsky
Attorney, Agent, or Firm—Bielen and Peterson

[57] ABSTRACT

High Pressure reciprocator components for reciprocating machines particularly internal combustion engines, the components include a multiple ring, single groove, piston seal having stacked ring elements with top contraction rings to block cylinder pressure from entry behind the rings and bottom expansion rings to contact the cylinder and seal with constant force throughout the piston cycle; a wristpin bearing assembly for tandem, toggle motion connecting rods connecting a single piston with dual, counter rotating crankshafts, the bearing assembly having a bearing seat for positioning juxtaposed wristpins in mutual, limited rolling contact to cancel side components of piston thrust force and frictions; and, a cross channel pressure converter interconnecting an exhaust conduit with a compressed air conduit with a channel having a free floating piston therein to equalize exhaust and intake pressures in a reciprocator to boost intake pressures or purging and charging the cylinder.

11 Claims, 2 Drawing Sheets

HIGH PRESSURE RECIPROCATOR COMPONENTS

BACKGROUND OF THE INVENTION

This invention relates to reciprocating machines such as pumps, compressors and engines and in particular is directed at boundary or interface components for effective high pressure, high efficiency operation of reciprocators.

These boundary or interface components are preferably used in an internal combustion engine of the type described in the application of Paul, Ser. No. 805,184 filed Dec. 5, 1985, entitled, Regenerative Thermal Engine. In that application engine designs were presented enabling peak cylinder pressures up to 180 atmospheres. While such pressure is greater than the peak pressure of conventional engines, further increasing peak pressure will exceed known design limits for piston seals and rod pins and cause design problems for effective air charging of the combustion chamber. The invented improvements solve those problems and enable design limits of 200 to 300 bars to be achieved in a two cycle engine. Since these improvements, particularly the sealing and bearing improvements, solve boundary or mechanical interface problems, their application is not limited to hyperbar combustion engines. Applications extend to compressors, pumps and other machines, principally reciprocating devices, where a translation of linear and rotary motion occurs. The rigorous operating conditions of the internal combustion engine, however, provide the exemplary environment for description of the preferred embodiments. The reciprocator in the engine system described in this application is capable of achieving peak combustion pressures of 200–300 bars. At such pressures, conventional piston rings are squeezed outward in their groves and forced against the cylinder wall by the pressure of the combustion gases that seep behind the rings. For example, in a ring system having three staggered rings in three spaced grooves, a pressure equivalent to 80% of the combustion chamber pressure is developed behind the top ring, a 50% chamber pressure is developed behind the center ring and a 20% chamber pressure is developed behind the bottom ring. The forced expansion of the rings dramatically increases slide friction between the contact edge of the rings and the wall of the piston. In addition to excessive friction losses, excessive wear and scarring render conventional piston ring assemblies unacceptable for high pressure cylinder environments. Although the regenerative cylinder wall of the referenced application provides a labyrinth-groove type solution to the expanding ring problem, its use is most effective in high r.p.m. devices and is not entirely suitable for engines operating at low or variable speeds where positive sealing is preferred.

The ring assembly of this invention solves the problems of conventional rings and enables extremely high chamber pressures to be obtained by a positive seal ring system with minimal leakage and friction.

Maximizing peak combustion pressures substantially increases effective engine efficiencies, but has heretofore been limited by design considerations relating to the wristpin interconnecting the piston head and the connecting rod. The dual pin arrangement for the tandem connecting rod and double crank assembly of the referenced application improves the operating specifications for a pin design by sharing the load between two pins. However, further increasing pin size to distribute loads over a greater surface area is limited by the piston diameter and bearing structure necessary to accommodate and encompass the two spaced pins. Lengthening the connecting rod to reduce the component of side force on the wristpin increases the size of the engine and magnifies adverse inertial effects.

This problem is solved by the dual, interfacing wristpin assembly of this invention, which remarkably eliminates that portion of rotary slide friction generated by the side component of the thrust force during the power stroke. The dual wristpin thus increases the effective surface area for distribution of thrust forces and enables use of short connecting rods without increase in friction forces.

The third component for high pressure systems is a pressure equalizer. The equalizer or converter has application primarily in internal combustion engines. The pressure equalizer assembly comprises an interconnecting passage or channel between the exhaust conduit and the compressed air intake conduit with a displaceable barrier in the channel. In a high pressure two cycle reciprocator, intake air must be sufficiently pressurized to purge exhaust gasses. To assure that the pressurized intake air has at least reached the discharging exhaust pressure, cross-manifold devices have been developed, such as the COMPREX ® pressure-wave supercharger that equalizes exhaust and intake pressures. In the Comprex an external power connection rotates a multivane rotor. The radial vanes are parallel with the axis of rotation in the manner of a paddle wheel. Discrete passages are formed between the vanes for the exhaust and air to meet, but not mix. Rotation allows a gradient to develop such that the lower pressure compressed air is raised in pressure and the high pressure exhaust is lowered in pressure as the vanes transport the gases from one radial position to another. Although suitable for a multi-cylinder engine where gas pressures are relatively stable, in a single cylinder engine pulsing problems require a different solution. The positive displacement floating piston equalizer divided herein effectively adapts the unique pressure balance concept of the Comprex to a monocylinder engine.

SUMMARY OF THE INVENTION

This invention relates to reciprocating machines and in particular to engine components enabling high pressure operation. Two of the primary barriers to increasing operating pressures in piston reciprocators have been seal designs and bearing designs. The associated problem in two cycle piston engines of exhaust scavenging has also been a barrier to increasing operating pressures. These barriers as described in the foregoing section have been solved by the associated components of the invention.

These components are described with relation to an internal combustion engine, but as noted have other applications, predominantly in reciprocating machines.

High pressure, low friction, piston-cylinder sealing is accomplished by a stacked ring assembly in a single piston groove. The two top rings are contraction rings arranged with staggered ring splits to seal the back of the groove. The two lower rings are expansion rings, stacked under the top rings with staggered ring splits to seal the space between piston and cylinder. Because back pressure is eliminated from behind the expansion rings, the friction force is dependent solely on the spring constant, selection of which is totally within the control of the designer. Since the expansion will not be affected by the combustion chamber pressure, the designer can choose an expansion ring according to the degree of sealing required for the particular operating pressures encountered.

A related problem to the piston seal is the piston bearing at the wristpin. At excessively high chamber pressures, developed thrust forces can overwhelm the capability of the bearing to function. The devised twin-pin, contact bearing expands the effective projected surface area for distribution of thrust forces, and, by opposed roller contact of the two wristpins, cancels the side component of thrust force. This is accomplished by utilizing a dual piston rod assembly connected to a pair of counter rotating crank shafts. The wristpin for each connecting rod is arranged in a side by side position, each in contact with the other. Since the motion of the rods are toggle-like, the juxtaposed pins roll against each other in the bearing housing of the piston, mutually cancelling side thrust forces in a rolling contact as differentiated from friction producing sliding contact.

Since the bearing housing for the pins need not encompass each pin, the effective diameter of the pins can be increased to expand the projected area presented to the thrust force developed by the piston in the power stroke. A reduce force per unit area avoids the purging of lubricants caused by excessive bearing pressures that leads to seizures. Rolling action in fact aids in conveying lubricant to the bearing surfaces encountering sliding contact with the wristpin.

With these novel sealing and bearing solutions, high cylinder pressures are achievable. In engines, particularly two cycle internal combustion engines, high combustion pressures usually means high exhaust pressures unless unusually long piston strokes are used. While air compression need not approach peak combustion pressures, it nevertheless must equal or exceed exhaust pressures to purge the cylinder of combustion gases and provide a fresh charge for the next compression stroke.

Since exhaust briefly preceeds admission, a pressure pulse exceeding that needed for air admission is generated in the exhaust system. By interconnecting the exhaust and intake system this pulse can be used to further pressurize the compressed air. The mechanism to accomplish this task is a cross-conduit between exhaust and intake with a free floating piston therein to act as a diaphragm to prevent mixing of the gases. The compressed air receives a final boost before entry into the cylinder by displacement of the piston. Subsequently, the expanded exhaust is partially purged from the exhaust duct by the piston's return. The equalizer, in addition to the compression boost, smooths the operation of the system by acting as a buffer between the major rotary and reciprocal components of the preferred embodiments.

Because of the tremendous pressures generated by the opposed pistons and displaced crank configuration, elongated through bolts are used to maintain the structural integrity of the engine block.

These and other features will become apparent from a consideration of the preferred embodiment.

DETAILED DESCRIPTION OF THE PREFERRED EMBODIMENT

Figure 1:
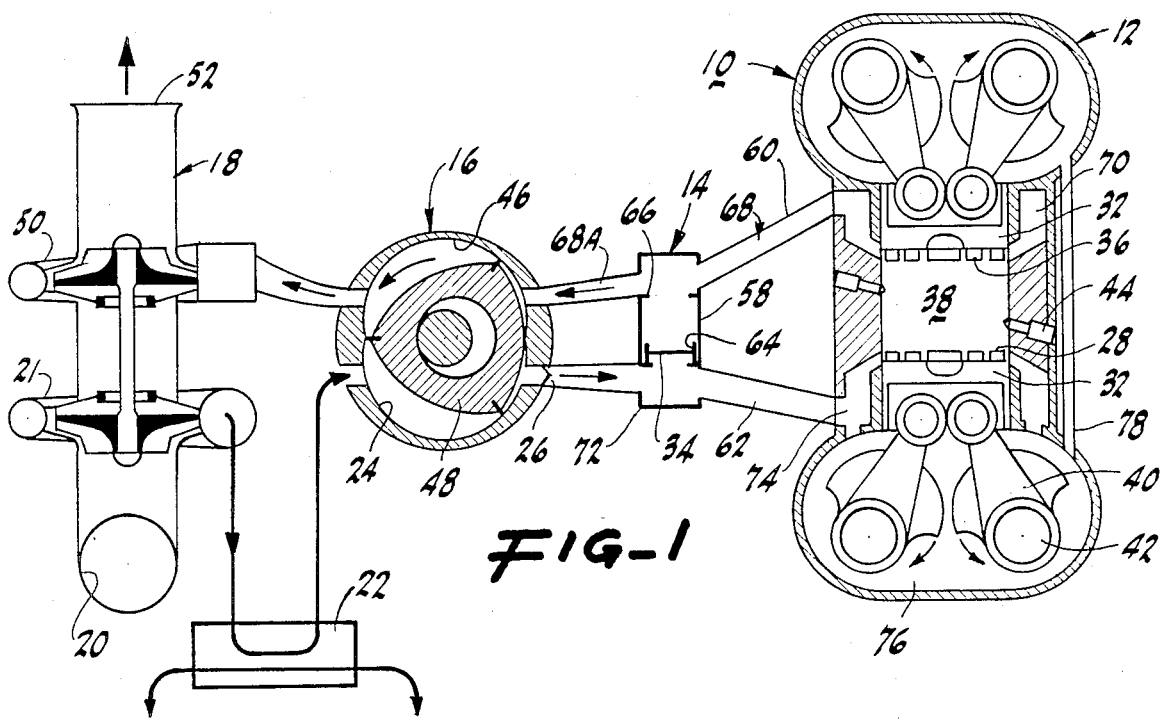
FIG. 1 is a schematic of the preferred engine system for the high pressure components of this invention.

Referring to the schematic illustration of FIG. 1, the preferred engine system is shown and designated generally by the reference numeral 10. The engine system 10, is a thermoenergetical cascade of coupled components including a high pressure reciprocator 12, a free piston converter 14, a positive displacement, midpressure, rotary compressor/expander 16, and a low pressure turbocharger 18. These primary components enable staged compression of intake air from atmospheric conditions at the turbocharger 18 to hyperbaric conditions at the reciprocator 12. In this arrangement an overall compression ratio exceeding 20 to one and peak combustion pressure exceeding 200 bar are achieved by the novel turborotoreciprocator 10.

In the schematic shown, air is drawn into the turbocharger 18 through an inlet 20, and compressed in the compressor side 21 of the turbocharger. The compressed air is then fed through an intercooler 22 where the compressed air is cooled before admission into the cold side 24 of th rotary compressor/expander 16. The turbocharged air receives its major compression in the rotary compression, which is a positive displacement compressor, here a modified Wankel-type engine. The rotocompressed air is discharged to the free piston converter 14 through a flap valve 26. The free piston converter 14 comprises a buffer between the rotary component and the reciprocator 12 and is described in greater detail hereafter. The compressed air enters the high pressure reciprocator 12 through intake ports 28 in the cylinder 30 which are exposed when the pistons 32 are at the end of their power stroke. A pressure boost is provided to the compressed air on entry by a floating piston 34 in the converter 14 which is displaced by the high pressure exhaust gases which exit through exhaust ports 36. The compressed air scavenges the combustion chamber 38 and provides the air charge for the compression stroke of the reciprocator 12.

The two opposed pistons 32 of the reciprocator 12 each have two connecting rods 40 which connect to counter rotating crankshafts 42. The dual connecting rod arrangement eliminates side thrust N of the pistons 32 against the common cylinder 30. When the pistons approach top dead center, fuel is injected into the remaining space between pistons by injectors 44. The high pressure expanding combustion gases drive the pistons apart and exhaust through the exhaust ports 36. The gases pass through the converter 14 displacing the floating piston 34 as noted and enter the hot side 46 of the rotary compressor/expander 16. The combustion gases drive the rotor 48 before exiting the rotary component 16 and entering the turbine side 50 of the turbocharger 18 where final expansion occurs before the low temperature, low pressure, combustion gases are finally released to the environment through an exhaust 52.

The principal improvements enabling high pressure operation of the reciprocator are the unique free piston converter 14, shown in the schematic view of FIG. 1, the piston ring assembly 54, and the dual wristpin assembly 56 shown in greater detail with reference to FIGS. 2-5 A-B.

The free piston converter 14, because of its simplicity, is adequately illustrated schematically and comprises a cross channel 58, which is square, rectangular or circular in cross section. The cross channel 58 interconnects the exhaust duct 60 and the intake duct 62. Within the cross channel 58 is the free floating, light weight piston 34 which conforms in cross sectional configuration to the channel 58. The piston 34 has a peripheral flange 64 to prevent it from cocking, and, the channel 58 has end stops 66 to retain the floating piston in the channel. In operation, the high pressure exhaust surge pressurizes an exhaust box 68, consisting of the exhaust manifold 70, the exhaust duct 682 between reciprocator 12 and rotor component 16, and, the cross channel 58 bounded by the piston 34. The pressure causes the effective volume to increase as the piston 34 displaces. An inherent resulting effect is the further compression of air in an air box 72 consisting of the air manifold 74, the air duct 62, and that part of the cross channel 58 bounded by the free piston 34. As the pressure of the exhaust gases wanes during the expansion drive of the rotor component, the new charge of air into the air box 72 from the rotor component overcomes the exhaust box back pressure driving the free piston back to the exhaust side of the channel. This oscillating action buffers the gas surges and effectively assures that the compressed air is of sufficient pressure to scavenge the combustion gases in the reciprocator.

Generally, the air box will be larger than the exhaust box to minimize pressure drop in changing the cylinder. To minimize engine size the air box may include a pressurized crank case 76 designed with a communicating channel 78 between the twin sections in the preferred reciprocator. In such systems the displacement of the dual pistons will assist in developing the necessary pressure surge for effective scavenging in a manner similar to low pressure two-cycle engines. Appropriate configurations for .the free piston converter, that comprises the interconnection module between the rotary component and the reciprocator, are best designed for the particular engine system specifications desired.

Referring now to FIGS. 2-5 A-B, the reciprocator 12 has a housing 80 primarily retained by through bolts 82 designed to withstand the explosive pressures of the central combustion chamber 38 and maintain the spacial integrity of the displaced crank cases 76. The opposed pistons 32 are shown at the bottom of their stroke exposing intake ports 36 and exhaust ports 38. The exhaust manifold 70 has a liner 84 and the cylinder 30 has a cooling chamber 86, not required at the cool opposite end housing the air manifold 74. The twin connecting rods 40 of the pistons 32 are connected to the counter rotating crankshafts 42 housed in the split crank case 76 which, as shown in the lower left quarter section, supports the main bearings 88 of the shafts 42.

The connecting rods 40 each have wristpin assemblies 56 with separate piston pins or wristpins 90, connecting bolts 92, and a dual bearing housing 94. The bearing housing 94 is formed in the skirt section 96 of the piston which is connected to a high temperature head section 98 by bolts 99.

Figure 3:
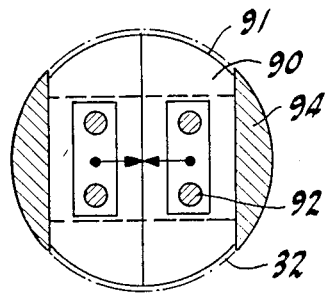
FIG. 3 is a cross sectional view taken on the lines 3—3 in FIG. 2.

The wristpins 90 have hollow ends 91 with a curvature as shown in FIG. 3 to conform to the circular cross section of the piston. As shown, the wristpins are juxtaposed such that they contact one another in a rolling motion as the rods 40 move in a toggle action during counterrotation of the crank shafts. Not only are piston side thrusts eliminated, but the oppositely directed side forces on the crank pins are cancelled at the contact surface of the wrist pins 90. The ends 91 of the wristpins 90 are displaced slightly from the peripheral surface of the piston 32 to provide clearance for the oscillations of the pins.

Figure 4:
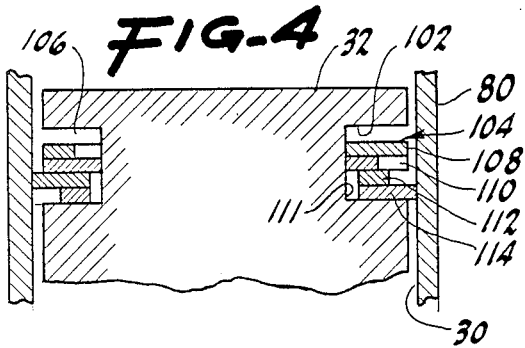
FIG. 4 is an enlarged cross sectional view of the ring assembly.
Figure 5A:
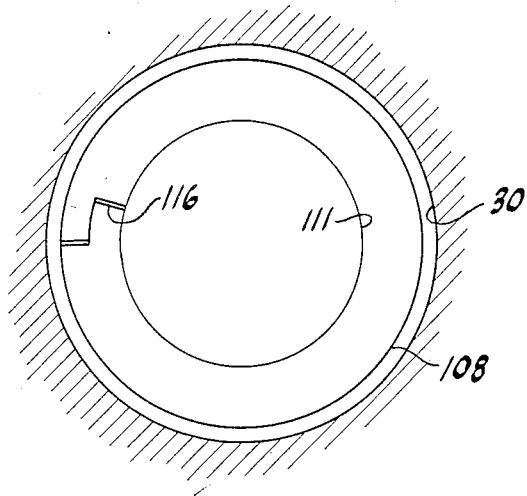
FIGS. 5 A-B are top plan views of the rings in the ring assembly.
Figure 5B:
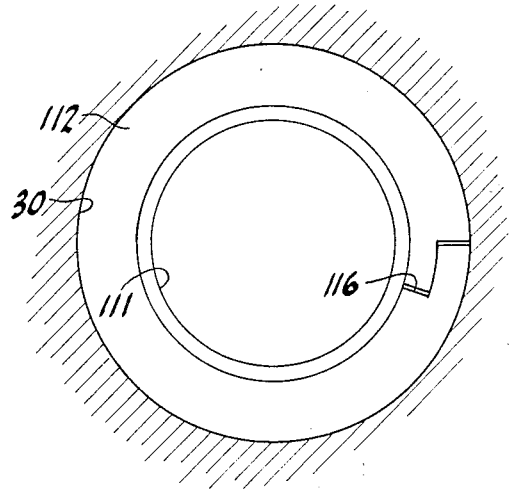
Figure 2:
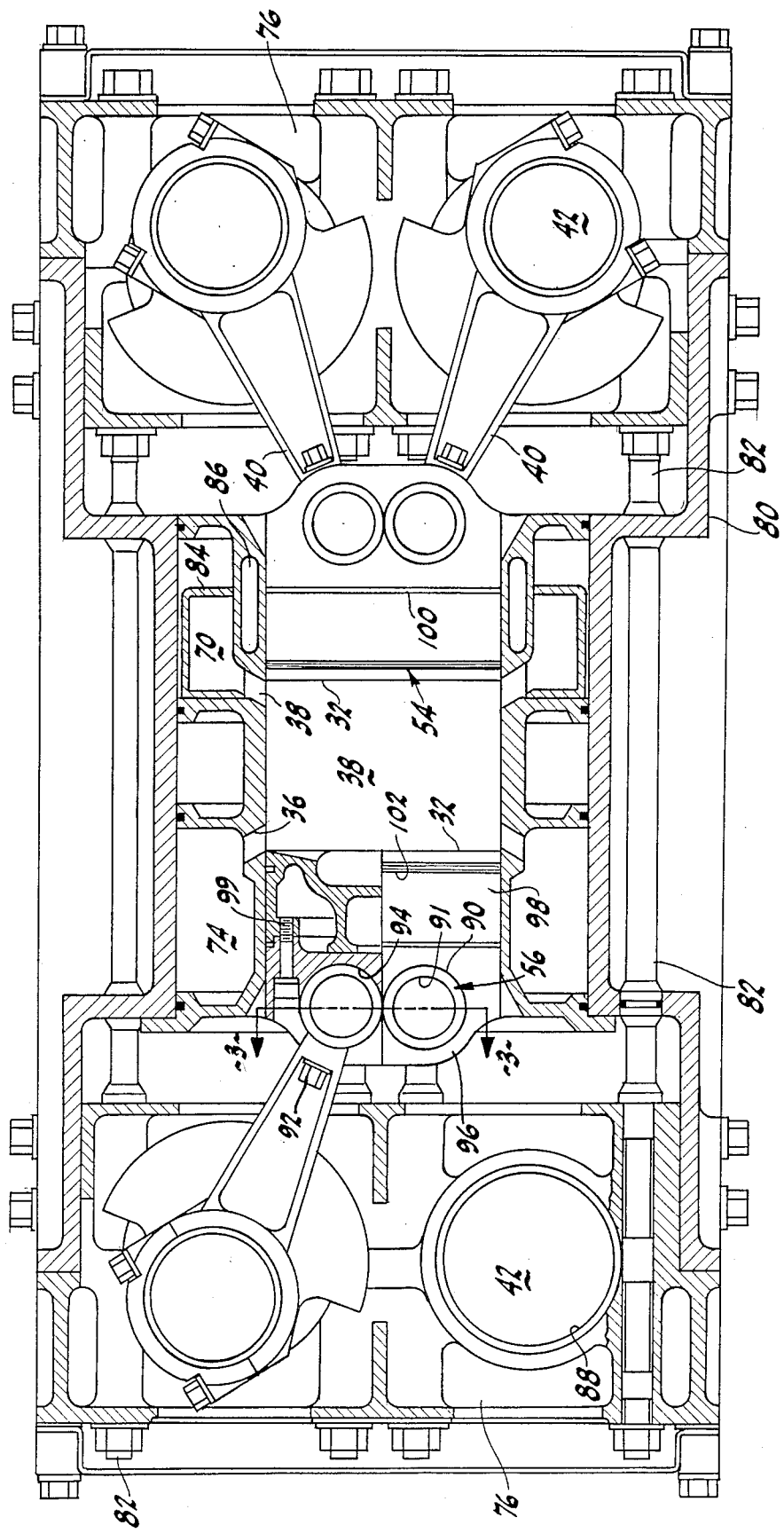
FIG. 2 is a cross-sectional view of the reciprocator component of the engine system.

Also shown in FIG. 2 is the novel ring assembly 54. The pistons 32 have a conventional oil ring 100 between the skirt and head sections of the piston. However, proximate the top surface of the head section 98 is a groove 102 housing a stacked array of rings 104 which are detailed in FIG. 4 and 5 A-D. In FIG. 4 an enlarged partial cross section of an exemplar piston 32 is shown. The groove 102 has an exaggerated tolerance space 106 above the stacked rings 104. The two top rings, 108 and 110, are designed with a spring force tending to contract the rings and thus are spring biased against the back 111 of the groove 102. The two bottom rings 112 and 114 are designed with a spring force tending to expand the rings and thus are biased against the cylinder 30. Exemplar rings 108,112 are shown in FIGS. 5A and 5B. Two rings of each type are preferred to stagger the ring splits 116 to prevent gas leakage through the splits. However, a two ring system may be used where split leakages is controlled by a sloped or labyrinth interface at the split to reduce leakage to acceptable levels.

As evident from the arrangement shown in FIG. 4, the two top rings 108, 110 seal the back 111 of the groove 102 and the two bottom rings 112, 114, by their inherent expansion force only, seal the space between piston and cylinder. The integrity of the stack is maintained by the combustion gas pressure which compresses the stack and retains the tolerance space 106, exaggerated in FIG. 4, at the top during the power stroke.

While the piston ring assembly and wristpin assembly were described with respect to a high pressure reciprocal engine, it is apparent that these structures have other applications where sealing and bearing problems arise, for example in fluid pumps and compressors.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A two-cycle internal combustion engine having at least one reciprocating piston, a crankshaft means, a single cylinder in which combustion gases are generated and improved, component means for high pressure operation of the engine comprising:

a sealing means for sealing the piston with respect to the cylinder, connecting means for interconnecting the piston and the crankshaft means, wherein the connecting means for interconnecting the piston and the crankshaft means includes a pair of counterrotating crankshafts, the connecting rods each having a first end connected to one of the crankshafts and a second end connected to a wristpin, the piston having a bearing means for seating the wrist pins side by side in mutual contact with each other, wherein the connecting rods have an effective toggle joint action imparting a rolling contact between the wristpins with each other that cancels opposed side components of piston thrust force, and pressurized air admission means for scavenging and charging the cylinder with pressurized air including an air duct means for admitting air to the cylinder and exhaust duct means for exhausting combustion gases from the cylinder and channel means with a passage interconnecting the air duct means and exhaust duct means the passage having a free-floating displaceable barrier separating compressed air and exhaust gases, the barrier being displaced solely by the bias caused by pressure differentials between exhaust gases and compressed air for equalizing the pressure of the exhaust gases and compressed air.

2. The component means of claim 1 wherein the barrier comprises a free floating piston, wherein the piston and the channel means have substantially identical cross sections.

3. The component means of claim 2 wherein the passage of the channel has a straight segment with end stops and the piston is displaceable in the straight segment between the end stops.

4. The component means of claim i wherein 1 wherein the cylinder has an air intake port connected to the air duct means and a combustion gas exhaust port connected to the exhaust duct means, said channel means being proximately arranged with the intake port and exhaust port wherein a surge pressure in combustion gases in the exhaust duct effectively boosts air pressures in the air duct by displacement of the barrier.

5. The component means of claim 1 wherein the sealing means for sealing the piston with respect to the cylinder includes a piston ring assembly comprising a top piston groove with a back and a plurality of split piston rings stacked in the piston groove, at least one first ring having a spring bias tending to contract the ring and at least one second ring having a spring bias tending to expand the ring, wherein the piston has a top end, and the first ring is positioned in the groove proximate the top end and comprises the piston ring uppermost on the piston, to seal between the piston and cylinder.

6. The component means of claim 5 wherein the ring assembly has two first rings and the two second rings, the rings having splits arranged in staggered fashion around the groove to prevent gas leakage through the splits.

7. A high pressure internal combustion engine comprising:

a pair of displaced crankshaft housings;
a single cylinder between the crankshaft housings;
a pair of opposed pistons in the cylinder arranged with facing piston heads, the heads and cylinder segments between heads forming the combustion chamber;

a pair of counterrotating crankshafts mounted in each crankshaft housing;

dual connecting rods connecting each piston to the counterrotating crankshafts in each crankshaft housing, each connecting rod having a wristpin mounted in parallel, juxtaposition in the piston, wherein the pistons each have a bearing structure wherein the two wristpins are arranged in side by side rolling contact with each other in the bearing structure for cancellation of side forces of thrust, and wherein combustion in the combustion chamber separates the opposed pistons transmitting forces of combustion to the crankshafts and crankshafts housings; and, interconnection means for maintaining the structural integrity of the engine comprising elongated through bolts interconnecting the crankshaft housing for receiving the major forces generated by combustion.

8. The high pressure internal combustion engine of claim 7 wherein the projected bearing surface for the dual contacting wristpins in each piston is substantially equal to the cross sectional area of the piston.

9. The high pressure internal combustion engine of claim 7 wherein the pistons each have a piston ring assembly comprising;

a top piston groove with a back and a plurality of split piston rings stacked in the piston groove, at least one first ring having a spring bias tending to contract the ring and at least one second ring having a spring bias tending to expand the ring, wherein the piston has a top end and the first ring is positioned in the groove proximate the top end and comprises the piston ring uppermost on the piston to seal the back of the groove and the second ring is positioned in the groove under the first ring to seal between the piston and cylinder.

10. In a reciprocator having a cylinder, with a high pressure section and a reciprocating piston with a head facing the high pressure section, a piston ring assembly for sealing between the piston and cylinder comprising:

a top piston groove with a back and a plurality of split piston rings stacked in the piston groove, at least one first ring having a spring bias tending to contact the ring and at least one second ring having a spring bias tending to expand the ring, wherein the piston has a top end and the first ring is positioned in the groove proximate the top end and comprises the piston ring uppermost on the piston to seal the back of the groove and the second ring is positioned in the groove under the first ring to seal between the piston and cylinder.

11. The reciprocator of claim 10 wherein the ring assembly has two first rings and two second rings, the ring having splits arranged in staggered fashion around the groove to prevent gas leakage through the splits.

* * * * *